F. SEPULCHRE.
APPARATUS FOR PURIFYING GASES.
APPLICATION FILED JAN. 6, 1908.
931,229.
Patented Aug. 17, 1909.
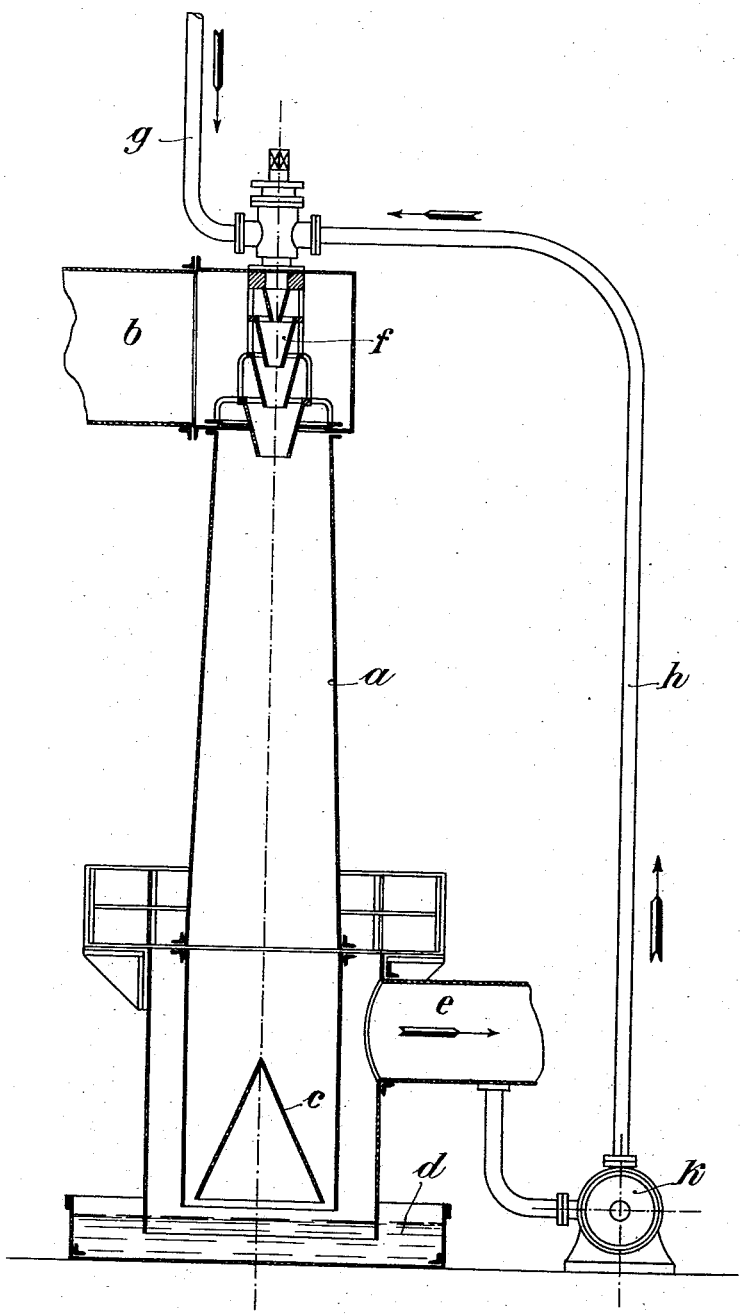

UNITED STATES PATENT OFFICE.

FRANÇOIS SEPULCHRE, OF LIEGE, BELGIUM.

APPARATUS FOR PURIFYING GASES.

No. 931,229.   Specification of Letters Patent.   Patented Aug. 17, 1909.

Application filed January 6, 1908. Serial No. 409,520.

*To all whom it may concern:*

Be it known that I, FRANÇOIS SEPULCHRE, a subject of the King of Belgium, residing at Liege, Belgium, manufacturer, have invented a certain new and useful Apparatus for Purifying Gases, of which the following is a full, clear, and exact description.

The dynamic purification of gases charged with solid or liquid particles, with a view to the separation or recovery of these last, is obtained at the present time in apparatus based either upon the principle of centrifugal force or upon that of inertia. As a rule, in these apparatus there is injected a certain quantity of water, in the form of a shower obtained by breaking the jet of water against the walls of the apparatus. The atoms of water thus meet and take up the particles of dust, forming a muddy liquid which is allowed to escape. It has been remarked that hot gases cannot be purified by these dynamic processes: this is because the atoms of water are vaporized instantly and so tend to saturate the gas with water vapor. Now the quantity of vapor required to saturate a given quantity of gas increases very rapidly with the temperature and as the pumps or other similar apparatus atomize relatively little water, the atoms are wholly or in part vaporized, with the result that the purification suffers. Moreover the gas becomes charged with water, which greatly diminishes its calorific value. The disadvantages of the apparatus of this type are the following:—(1) They require considerable power to atomize the water; moreover a portion of the spray obtained condenses in the remainder of the water, so to say proportionally to its formation and before having had time to act upon the dust. (2) The mechanical efficiency being very bad, the greater part of the mechanical work is transformed into heat: now, as has been stated above, heat is prejudicial to the purification. It has been attempted to divide the water mechanically by submitting it in special pipes to the combined action of inertia and centrifugal force: the water is thus more completely divided but still not sufficiently well to effect a thorough purification. On the other hand it has been tried to divide the water by means of steam, but the results obtained have not been satisfactory.

The object of the present invention is to purify the gas, or to recover its by-products, by atomization of the water by means of a suitable gas. The nature of the gas used will be determined by the circumstances of each application; in the majority of cases, compressed air would be objectionable—for blast-furnace gases for example—because it might give rise to an explosive mixture; carbon dioxid would diminish the calorific properties of the gases, and so on. In this case there would therefore be chosen by preference blast-furnace gas itself, previously purified or not. In certain cases, where another combustible gas was available, it might be employed for the atomization: this might be the case, for example, in certain iron foundries which possess a supply of coke-furnace gas.

This process also allows of purifying other industrial gases as well as blast furnace gas: the gas from gas producers or other generators, for example, that of coke and other ovens, by freeing them from the solid, liquid or gaseous impurites which they contain. The process allows also of collecting the by-products of coke and other ovens or furnaces: after cooling the gas to a suitable temperature it is possible to separate the vesicles of tar in suspension in the gas by a tar-spray; similarly the ammoniacal gas will be absorbed by a water-spray; the benzol, by an oil-spray etc. In its expansion, the compressed gas, as well as atomizing the water more finely than any other known method, produces an extremely rapid and intense effervescence, the result of which is to mingle intimately the spray with the gas to be purified, which is evidently favorable to the purification. Finally, the small atoms of the spray are impressed with a high speed derived from that of the compressed gas, and that gives them sufficient momentum to collide forcibly with the particles of dust which are thus absorbed by the water.

The advantages of the process are the following: (1) It gives abundant atomization with a reduced volume of compressed gas, forming a real spray, resulting in high mechanical efficiency; (2) it allows of avoiding the introduction of any objectionable element into the gas, such as steam, in the case of blast-furnace gas, air, etc., and even of introducing desirable elements; (3) the expansion of the gas produces a cooling, contrary to the result with other processes, and thus reduces the content of the gas in water vapor instead of increasing it.

It will be obvious that the apparatus for atomizing by compressed gas can eventually serve as aspirator of the gas to be purified or as compressor of the gas under purification or already purified. In the same way, this water-atomizer operated by compressed gas can be adapted to any known purifying apparatus in order to increase its efficiency; it can be applied extremely well to, for example, apparatus of the centrifugal type, such as the fan-washer, the Theisen washer, etc., relieving them of the function of atomizers which they perform very badly. Likewise it completes, in a very useful fashion, the process of purifying based upon inertia.

The annexed drawing represents, in vertical section and by way of example, a manner of carrying out the present invention applied to one of these last apparatus, completed accordingly.

The gases coming from the blast or other furnace traverse under the pressure they possess or that given to them by a suitable compressor or aspirator, a suitable separator and scrubber and are admitted into the purifier $a$ by the pipe $b$. This purifier consists of a straight vertical column, of which the lower open end is restricted by means of a central cone $c$, intended to throw the gases with high velocity and in the form of a thin sheet against the liquid bath $d$ before their escape by the pipe $e$. A water atomizer $f$, arranged at the upper part of the purifier $a$ is fed by the pipe $g$ with water under pressure and by the pipe $h$ with gas, a portion of the purified gas being compressed thereinto by a compressor $k$, connected to the delivery pipe $e$ of the purifier proper. Upon their entry into the purifier, the gases are energetically scoured with the spray formed by the gas injector $f$ while the gaseous current is directed immediately on to the liquid bath $d$, which collects the solid or liquid particles to be eliminated. The purified gases then escape by the pipe $e$ and are led to the apparatus for which they are required. Conversely it would eventually be possible to inject the purifying liquid under very high pressure and consequently at very high velocity, into the gas to be purified; the atomization of the liquid being then produced by the excess of its velocity over that of the gas.

No claim is herein made to the novel features of the process described and for carrying out which the apparatus illustrated may be employed.

Having thus described my invention what I claim as such and desire to secure by Letters Patent is:—

1. An apparatus for purifying blast-furnace and other gases, with a view to the recovery of their by-products, comprising a straight, vertical column, said column receiving the gases at its upper end and being open at its lower end, said lower end being restricted by a central cone to form an annular opening, said opening being immediately over a bath of liquid, an atomizer placed at the top of said column, said atomizer being operated by compressed gas, a spray of liquid from said atomizer descending down said column, a compressor, said compressor taking a portion of the purified gases and delivering them to operate said atomizer, said spray of liquid absorbing the impurities from said gases and being projected therewith into said bath of liquid, and a pipe for the escape of the purified gases.

2. In an apparatus for purifying gas, the combination of a vessel, a conduit communicating with the vessel and adapted to convey thereto the gas to be treated, an atomizer arranged to discharge a spray into the body of gas within the vessel, means for supplying liquid under pressure to said atomizer, means for withdrawing gas from the vessel and supplying it to the atomizer under pressure, and means for separating the gas from the spray and particles saturated thereby.

3. In an apparatus for purifying gas, the combination of a vessel, gas inlet and discharge pipes communicating with said vessel, an atomizer arranged to discharge a spray into the vessel adjacent the gas inlet, means for supplying liquid under pressure to the atomizer, and means connecting the gas discharge pipe and said atomizer, for the purpose specified.

4. In an apparatus for purifying gas, the combination of a vessel, open at its lower end, a gas inlet pipe communicating with the upper end of said vessel, means for supporting a body of liquid below the lower end of the vessel, a casing surrounding the lower portion of the vessel and having its lower open end extending below the level of the body of liquid, a gas discharge pipe communicating with the space between the vessel and casing, an atomizer arranged within the gas inlet of the vessel, means for supplying liquid to the atomizer, and means for supplying gas under pressure to the atomizer.

5. In an apparatus for purifying gas, the combination of a vessel or conduit open at its lower end, a gas inlet pipe communicating with the upper end of said vessel, a casing surrounding the lower portion of the vessel and extending below the lower end thereof, a gas discharge pipe communicating with the space between the vessel and casing above the lower end of the vessel, an atomizer arranged within the gas inlet of the vessel, means for supplying liquid to the atomizer, and means for supplying gas under pressure to the atomizer, whereby gas passing through said vessel or conduit is exposed to the action of a powerful spray and the saturated impurities are by gravity collected in said casing as the gas passes from the vessel or conduit.

In testimony whereof I affix my signature in presence of two witnesses.

FRANÇOIS SEPULCHRE.

Witnesses:
 JULES GILLON,
 ALPHONSE LERUTH.